(12) United States Patent
Kosetsu (10) Patent No.: US 9,834,109 B2
(45) Date of Patent: Dec. 5, 2017

(54) VEHICLE

(71) Applicant: Shintaro Kosetsu, Nagoya (JP)

(72) Inventor: Shintaro Kosetsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 14/647,329

(22) PCT Filed: Nov. 26, 2013

(86) PCT No.: PCT/IB2013/002931
§ 371 (c)(1),
(2) Date: May 26, 2015

(87) PCT Pub. No.: WO2014/083425
PCT Pub. Date: Jun. 5, 2014

(65) Prior Publication Data
US 2015/0298569 A1    Oct. 22, 2015

(30) Foreign Application Priority Data

Nov. 27, 2012 (JP) .................................. 2012-258596

(51) Int. Cl.
*H02J 7/00* (2006.01)
*B60L 11/00* (2006.01)
(Continued)

(52) U.S. Cl.
CPC ............. *B60L 11/1851* (2013.01); *B60L 3/12* (2013.01); *B60L 11/123* (2013.01); *B60L 11/14* (2013.01);
(Continued)

(58) Field of Classification Search
None
See application file for complete search history.

(56) References Cited

U.S. PATENT DOCUMENTS 5,650,710 A    7/1997  Hotta
7,679,336 B2 *  3/2010  Gale .................. B60L 11/1816
                                              180/65.1

(Continued)

FOREIGN PATENT DOCUMENTS

GB    2446694 A    8/2008
JP    H02-280633 A    11/1990
(Continued)

*Primary Examiner* — Leigh Garbowski
(74) *Attorney, Agent, or Firm* — Oliff PLC (57) ABSTRACT

A vehicle is configured to carry out external charging operation in which an in-vehicle battery is charged with electric power from a device outside the vehicle. The vehicle includes the in-vehicle battery, a charger and a control device. The charger is configured to output electric power from the device outside the vehicle to the in-vehicle battery. The control device is configured to control the charger so that the external charging operation is completed by time set by a user. Furthermore, the control device is configured to preferentially allocate a period of time during which the external charging operation is carried out in order of a priority time period set by the user, an immediate time period immediately after the priority time period and a preceding time period immediately before the priority time period.

9 Claims, 3 Drawing Sheets (51) Int. Cl.
  *B60L 11/18* (2006.01)
  *H02J 7/04* (2006.01)
  *B60L 3/12* (2006.01)
  *B60L 11/12* (2006.01)
  *B60L 11/14* (2006.01)
  *B60L 15/20* (2006.01)
  *H02J 7/02* (2016.01)

(52) U.S. Cl.
  CPC ......... *B60L 11/184* (2013.01); *B60L 11/1809* (2013.01); *B60L 11/1816* (2013.01); *B60L 11/1844* (2013.01); *B60L 11/1861* (2013.01); *B60L 15/20* (2013.01); *H02J 7/0073* (2013.01); *H02J 7/041* (2013.01); *B60L 2210/30* (2013.01); *B60L 2210/40* (2013.01); *B60L 2220/14* (2013.01); *B60L 2240/421* (2013.01); *B60L 2240/441* (2013.01); *B60L 2240/545* (2013.01); *B60L 2240/80* (2013.01); *B60L 2250/14* (2013.01); *B60L 2250/16* (2013.01); *B60L 2260/58* (2013.01); *H02J 7/0088* (2013.01); *H02J 7/02* (2013.01); *Y02E 60/721* (2013.01); *Y02T 10/6217* (2013.01); *Y02T 10/645* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 8,963,504 B2* | 2/2015 | Kuroda | H01M 10/44 320/137 |
| 9,056,552 B2* | 6/2015 | Muller | B60L 11/18 |
| 2004/0268162 A1 | 12/2004 | Morisawa | |
| 2010/0097036 A1* | 4/2010 | Wakayama | B60L 11/1861 320/153 |
| 2010/0164439 A1* | 7/2010 | Ido | B60L 11/182 320/155 |
| 2011/0175569 A1* | 7/2011 | Austin | B60L 11/1824 320/109 |
| 2012/0049793 A1 | 3/2012 | Ross et al. | |
| 2012/0161702 A1 | 6/2012 | Kim | |
| 2012/0290506 A1* | 11/2012 | Muramatsu | G01C 21/3469 705/412 |
| 2012/0293122 A1 | 11/2012 | Murawaka | |
| 2013/0093393 A1* | 4/2013 | Shimotani | B60L 3/12 320/109 |
| 2013/0197710 A1* | 8/2013 | Hansen | B60L 11/1824 700/297 |
| 2013/0278213 A1* | 10/2013 | Xue | B60L 11/1851 320/109 |

FOREIGN PATENT DOCUMENTS

| | | | |
|---|---|---|---|
| JP | H08-214412 A | | 8/1996 |
| JP | 2002-233054 A | | 8/2002 |
| JP | 2002233054 | * | 8/2002 |
| JP | 2005-025381 A | | 1/2005 |
| JP | 2012-186906 A | | 9/2012 |
| JP | 2012186906 | * | 9/2012 |

* cited by examiner

FIG. 1

, # VEHICLE

BACKGROUND OF THE INVENTION

1. Field of the Invention

The invention relates to a vehicle that is able to externally charge an in-vehicle battery with electric power supplied from a device outside the vehicle.

2. Description of Related Art

As a vehicle that is able to be externally charged, there is known a vehicle having a timer charging function of carrying out external charging operation in accordance with a schedule so that an in-vehicle battery is fully charged by estimated charging completion time (next estimated riding time) set by a user.

Japanese Patent Application Publication No. 8-214412 (JP 8-214412 A) describes a technique for, in a vehicle having the timer charging function, determining external charging start time so that external charging operation is completed at estimated riding time using a voltage value of an external power supply, a preset charging current value, and the like.

In the vehicle having the timer charging function, from what viewpoint a timer charging schedule is determined when a plurality of priority time periods (time periods during which an electric rate is low) are set or when a charging prohibited time period is additionally set.

From the viewpoint of cost reduction of external charging operation, it is desirable to carry out external charging operation in the priority time periods. On the other hand, from the viewpoint of reduction in standing time in a high SOC state (state where the state of charge of the in-vehicle battery is relatively high), it is desirable to complete external charging operation in a time period later as much as possible. From the viewpoint of prevention of deterioration of a relay that is operated to temporarily stop and resume external charging operation, it is desirable to minimize the number of temporary stops of external charging operation. JP 8-214412 A does not describe anything about the timer charging scheduling that takes these viewpoints into consideration.

SUMMARY OF THE INVENTION

The invention provides a vehicle configured to schedule timer charging operation in consideration of cost reduction in external charging operation, suppressing the number of temporary stops of external charging operation, and reduction in standing time in a high SOC state.

The aspect of the invention is a vehicle which is configured to carry out external charging operation in which an in-vehicle battery is charged with electric power from a device outside the vehicle. The vehicle includes the in-vehicle battery, a charger and a control device. The charger is configured to output electric power from the device outside the vehicle to the in-vehicle battery. The control device is configured to control the charger so that the external charging operation is completed by time set by a user. Furthermore, the control device is configured to preferentially allocate a period of time during which the external charging operation is carried out in order of a priority time period set by the user, an immediate time period immediately after the priority time period and a preceding time period immediately before the priority time period.

The control device may be configured to, when the priority time period includes a plurality of priority time periods, preferentially allocate the period of time during which the external charging operation is carried out in order of the plurality of priority time periods, a time period immediately after the latest priority time period among the plurality of priority time periods, and a time period immediately before the latest priority time period The control device may be configured to, when a period of time required to complete the external charging operation is shorter than a total time of the priority time periods, preferentially allocate the period of time during which the external charging operation is carried out to a later part of the priority time periods.

The control device may be configured to, when the required period of time is longer than the total time of the priority time periods and is shorter than a total time of the priority time periods and the time period immediately after the latest priority time period, allocate the period of time during which the external charging operation is carried out to an entirety of the priority time periods and a part of the time period immediately after the latest priority time period, the part being adjacent to the latest priority time period.

The control device may be configured to, when the required period of time is longer than the total time of the priority time periods and the time period immediately after the latest priority time period and is shorter than a total time of the priority time periods, the time period immediately after the latest priority time period and the time period immediately before the latest priority time period, allocate the period of time during which the external charging operation is carried out to the entirety of the priority time periods, an entirety of the time period immediately after the latest priority time period and a part of the time period immediately before the latest priority time period, the part being adjacent to the latest priority time period.

The control device may be configured to, when the required period of time is longer than the total time of the priority time periods, immediate time periods respectively immediately after the corresponding priority time periods and preceding time periods respectively immediately before the corresponding priority time periods and is shorter than a total time of the priority time periods, the immediate time periods, the preceding time periods and another time period, allocate the period of time during which the external charging operation is carried out to the entirety of the priority time periods, an entirety of the immediate time periods, an entirety of the preceding time periods and a later part of the another time period.

The control device may be configured to, when the required period of time is longer than the total time of the priority time periods, the immediate time periods, the preceding time periods and the another time period, allocate the period of time during which the external charging operation is carried out to the entirety of the priority time periods, the entirety of the immediate time periods, the entirety of the preceding time periods and an entirety of the another time period.

The control device may be configured not to allocate the period of time during which the external charging operation is carried out to a charging prohibited time period when the charging prohibited time period is set by the user.

According to the aspect of the invention, it is possible to schedule timer charging operation in consideration of cost reduction in external charging operation, suppressing the number of temporary stops of external charging operation, and reduction in standing time in a high SOC state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the following description, like reference numerals denote the same components. Names and functions of them are also the same. Thus, the detailed description thereof is not repeated.

Figure 1:
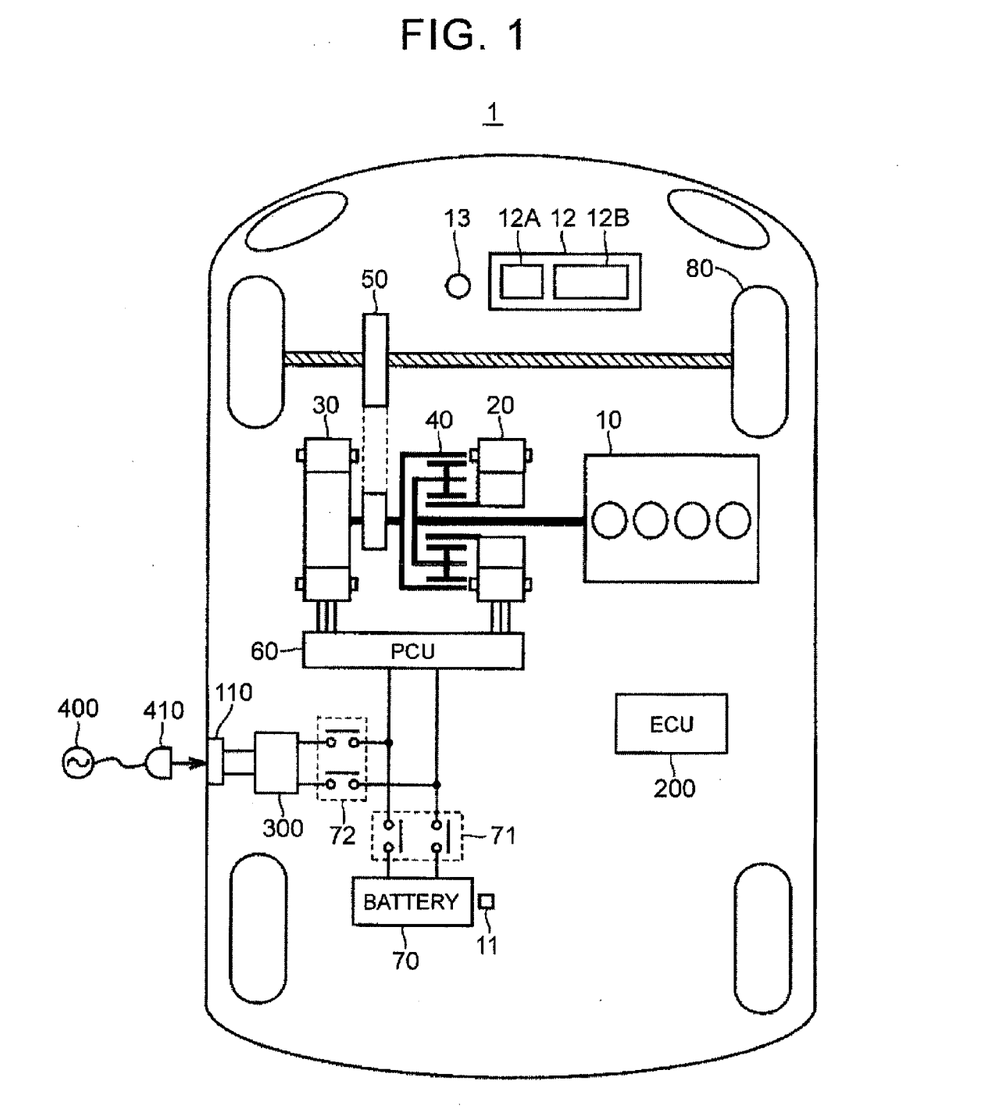
FIG. 1 is an overall block diagram of a vehicle.

FIG. 1 is an overall block diagram of a vehicle 1 according to the embodiment of the invention. The vehicle 1 includes an engine 10, a first motor generator (MG) 20, a second MG 30, a power split unit 40, a speed reducer 50, a power control unit (PCU) 60, a battery 70, drive wheels 80 and an electronic control unit (ECU) 200. Furthermore, the vehicle 1 includes a charging port 110 and a charger 300.

The vehicle 1 is a so-called plug-in hybrid vehicle. That is, the vehicle 1 is able to travel using power of at least one of the engine 10 and the second MG 30, and is able to charge the battery 70 with electric power supplied from a system power supply 400 outside the vehicle. The vehicle to which the invention is applicable is not limited to the hybrid vehicle. The invention is, for example, applicable to an electric vehicle that includes no engine.

The engine 10, the first MG 20 and the second MG 30 are coupled to one another via the power split unit 40. Power generated by the engine 10 is split by the power split unit 40 to two routes. That is, one is a route through which power is transmitted to the drive wheels 80 via the speed reducer 50, and the other is a route through which power is transmitted to the first MG 20.

The first MG 20 and the second MG 30 are alternating-current motors, and are, for example, three-phase alternating-current synchronous motors. The first MG 20 generates electric power using the power of the engine 10, split by the power split unit 40. The second MG 30 generates driving force using at least one of electric power stored in the battery 70 and electric power generated by the first MG 20. The driving force of the second MG 30 is transmitted to the drive wheels 80 via the speed reducer 50. For example, when the vehicle brakes, the second MG 30 is driven by the drive wheels 80 via the speed reducer 50, and the second MG 30 operates as a generator. Thus, the second MG 30 also has the function of regenerative braking. Regenerated electric power generated by the second MG 30 is stored in the battery 70.

The power split unit 40 is formed of a planetary gear unit including a sun gear, pinion gears, a carrier and a ring gear. The pinion gears are in mesh with the sun gear and the ring gear. The carrier supports the pinion gears so that the pinion gears are rotatable, and is coupled to a crankshaft of the engine 10. The sun gear is coupled to a rotary shaft of the first MG 20. The ring gear is coupled to a rotary shaft of the second MG 30 and the speed reducer 50. In this way, the engine 10, the first MG 20 and the second MG 30 are coupled to one another via the power split unit 40 formed of the planetary gear unit. Thus, an engine rotation speed, a first MG rotation speed and a second MG rotation speed have a relationship connected by a straight line in a nomograph (relationship in which, when any two of the rotation speeds are determined, the remaining rotation speed is also determined).

The battery 70 is a direct-current electrical storage device that stores electric power for driving the first MG 20 and/or the second MG 30. The battery 70 is, for example, a secondary battery formed to include nickel hydride, lithium ions, or the like. The output voltage of the battery 70 is, for example, about 200 V.

The PCU 60 is connected to the battery 70 via a system relay 71. The PCU 60 is controlled by a control signal from the ECU 200, and converts electric power between the battery 70 and both the first MG 20 and the second MG 30.

The charging port 110 is a power interface for receiving electric power (hereinafter, referred to as "external electric power") from the system power supply 400 outside the vehicle. The charging port 110 is configured to be connectable to a connector 410 connected to the system power supply 400 outside the vehicle.

The charger 300 is provided between the charging port 110 and the battery 70. The charger 300 is connected to the battery 70 via a charging relay 72 and the system relay 71. The charger 300 converts external electric power (alternating current), input to the charging port 110, to electric power (direct current), with which the battery 70 is chargeable, and outputs the electric power (direct current) to the battery 70 on the basis of a control signal from the ECU 200. Thus, the battery 70 is charged with external electric power. In the following description, charging the battery 70 with external electric power is termed "external charging operation".

Furthermore, the vehicle 1 includes a monitoring sensor 11, a display device 12 and a timer switch 13. The monitoring sensor 11 detects the state of the battery 70 (a battery current Ib, a battery voltage Vb, a battery temperature Tb), and outputs the detected result to the ECU 200.

The display device 12 includes an input unit 12A and a display unit 12B. The input unit 12A is used by a user to input various pieces of information. The display unit 12B is used by the user to display various pieces of information (for example, present time, and the like). The display device 12 may be, for example, a touch panel display.

The timer switch 13 is a switch for the user to conduct operation set and cancel timer charging operation (described later). The user is able to conduct similar operation to the input unit 12A of the display device 12. When the user conducts operation to set timer charging operation to the timer switch 13 or the input unit 12A, a signal indicating that fact is input to the ECU 200. When the user conducts operation to cancel timer charging operation to the timer switch 13 or the input unit 12A, a signal indicating that fact is input to the ECU 200.

The ECU 200 incorporates a central processing unit (CPU) (not shown) and a memory (not shown), and executes predetermined arithmetic processing on the basis of information stored in the memory and information from sensors, and the like. The ECU 200 controls devices of the vehicle 1 on the basis of the computed results.

The ECU 200 calculates the state of charge (hereinafter, referred to as "SOC") of the battery 70 on the basis of the result detected by the monitoring sensor 11.

When the user conducts operation to connect the connector 410 to the charging port 110 (hereinafter, referred to as "plug-in operation"), the ECU 200 closes the system relay 71 and the charging relay 72, and activates the charger 300. Thus, the ECU 200 automatically carries out external charging operation. When the battery 70 becomes a fully charged state (the SOC reaches a charging target value) through external charging operation, the ECU 200 determines that external charging operation has been completed, stops the charger 300, and opens the system relay 71 and the charging relay 72. Thus, the ECU 200 ends external charging operation.

External charging operation may be temporarily stopped as will be described later. In this case, if the system relay 71 and the charging relay 72 are kept in a closed state, there occurs an inconvenience that, for example, the battery 70 is discharged when a temporary stop time is long. Therefore, the ECU 200 according to the present embodiment temporarily opens the system relay 71 and the charging relay 72 even at the time when external charging operation is temporarily stopped, and closes the system relay 71 and the charging relay 72 again at the time external charging operation is resumed.

The ECU 200 carries out external charging operation in any one of an instant charging mode and a timer charging mode.

The ECU 200 carries out external charging operation in the instant charging mode when timer charging operation is cancelled by the user. In the instant charging mode, the ECU 200 starts external charging operation at the time when plug-in operation is conducted, and continues external charging operation until the battery 70 becomes the fully charged state. At the timing at which the battery 70 becomes the fully charged state, the ECU 200 ends external charging operation.

In this way, external charging operation is instantly carried out at the time of plug-in operation in the instant charging mode. Therefore, it is possible to complete external charging operation in a short period of time in preparations for the next travel. On the other hand, a period of time from completion of external charging operation to a start of the next travel extends, that is, a standing time in a high SOC state (state where the SOC is high) extends. Therefore, degradation of the battery 70 may be facilitated. In the embodiment according to the invention, the ECU 200 executes the timer charging mode so that the probability of an extended standing time in the high SOC state is reduced.

The ECU 200 carries out external charging operation in the timer charging mode when timer charging operation is set by the user. In the timer charging mode, when plug-in operation is conducted, the ECU 200 not starts external charging operation instantly but sets a charging schedule so that external charging operation is completed by estimated completion time t(e) preset by the user and then carries out external charging operation in accordance with the set charging schedule.

The user is allowed to preset information (hereinafter, referred to as "timer information"), which should be considered at the time when the ECU 200 sets the charging schedule, by operating the input unit 12A of the display device 12. The timer information includes, in addition to the above-described estimated completion time t(e), a time period during which external charging operation is intended to be carried out (hereinafter, referred to as "priority time period") and a time period during which external charging operation is intended to be prohibited (hereinafter, referred to as "prohibited time period"), and the like. The user may be allowed to set information other than the above (for example, time at which external charging operation is intended to be started, day on which external charging operation is intended to be carried out, and the like) as the timer information.

For example, when the user has signed a contract with a power company that maintains and manages the system power supply 400 so that an electric rate in a specific time period becomes cheaper than an electric rate in the other time period, the user is able to reduce the cost (electric bill) of external charging operation by setting the time period, in which an electric rate is cheap, to the priority time period. The user may set a plurality of the priority time periods.

The user is allowed to carry out external charging operation while avoiding a time period in which electric power becomes a peak by setting a time period, in which many home electric appliances, and the like, are used, to the prohibited time period. The user may set a plurality of the prohibited time periods. In the following description, a time period that is neither the priority time period nor the prohibited time period is termed "ordinary time period".

In the thus configured vehicle 1, when a plurality of the priority time periods are set or a prohibited time period is additionally set in the case where timer charging operation is carried out, it is a task from what viewpoint the timer charging schedule is determined.

From the viewpoint of cost reduction of external charging operation, it is desirable to carry out external charging operation in the priority time periods set by the user.

From the viewpoint of prevention of deterioration of the relays (the system relay 71 and the charging relay 72) provided in an external charging path, it is desirable to minimize the number of temporary stops of external charging operation. That is, if the plurality of priority time periods or the prohibited time period is set, it is required to temporarily stop external charging operation. As external charging operation temporarily stops and resumes, the system relay 71 and the charging relay 72 are also operated (opened or closed). Normally, these relays are components having an operation cycle life. Therefore, in order to prevent degradation of these relays, it is desirable to minimize the number of temporary stops of external charging operation.

From the viewpoint of prevention of degradation of the battery 70, it is desirable to carry out external charging operation in a time period that is later as much as possible. That is, if external charging operation is carried out early, a period of time up to a start of the next travel extends accordingly, and a standing time in the high SOC state extends. When the standing time in the high SOC state extends, the battery 70 may degrade. Therefore, in order to prevent degradation of the battery 70, it is desirable to carry out external charging operation in a time period later as much as possible.

The ECU 200 according to the present embodiment schedules optimal charging operation in consideration of the above-described viewpoints. Specifically, the ECU 200 preferentially allocates a period of time during which external charging operation is carried out in order of a priority time period, an immediate ordinary time period immediate after the priority time period and a preceding ordinary time period immediately before the priority time period.

Figure 2:
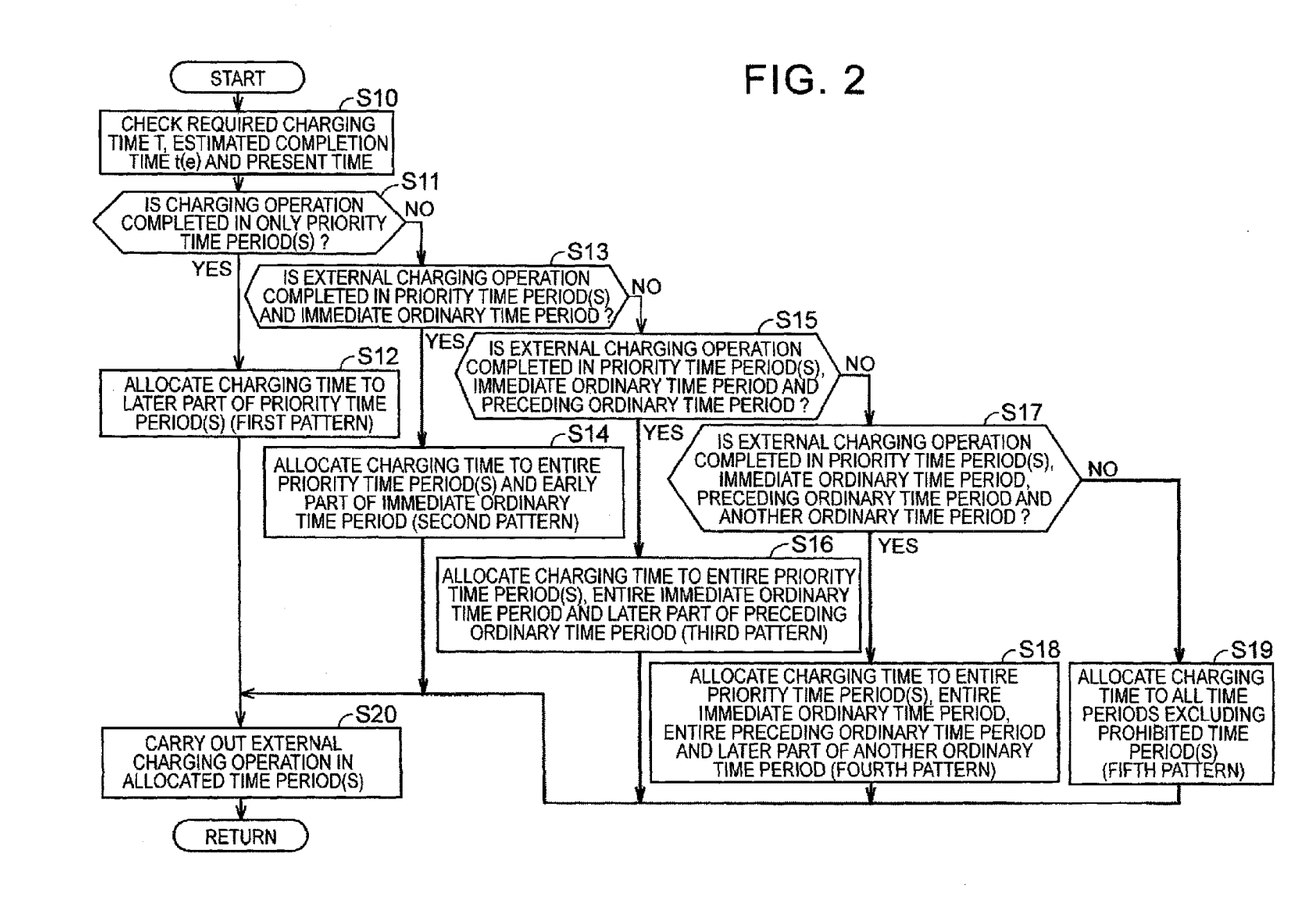
FIG. 2 is a flowchart that shows the procedure of an ECU.

FIG. 2 is a flowchart that shows the procedure in which the ECU 200 schedules timer charging operation.

In step (hereinafter, step is abbreviated as "S") 10, the ECU 200 checks a required charging time T, the estimated completion time t(e) set by the user, and present time. Here, the required charging time T is a period of time required to bring the battery 70 to the fully charged state through external charging operation. The ECU 200 checks (calculates) the required charging time T on the basis of, for example, a difference between the current SOC and the charging target value.

In the following processes of S11 to S19, the ECU 200 allocates the required charging time T to any one or more of time periods between the present time and the estimated completion time t(e).

In S11, the ECU 200 determines whether external charging operation is completed only in the priority time period. The ECU 200 determines that external charging operation is completed only in the priority time period when the required charging time T is shorter than a period of time of the priority time period (if there are the plurality of priority time periods, the total time of the priority time periods).

When affirmative determination is made in S11 (YES in S11), the ECU 200 allocates the charging time to a later part of the priority time period in S12. Specifically, the ECU 200 allocates the required charging time T to a part close to the end time of the priority time period. Hereinafter, such an allocation pattern is also termed "first pattern".

When negative determination is made in S11 (NO in S11), the ECU 200 proceeds with the process to S13, determines whether external charging operation is completed in the priority time period and the immediate ordinary time period immediately after the priority time period. In the following description, the immediate ordinary time period immediately after the priority time period is simply referred to as "immediate ordinary time period". If there are the plurality of priority time periods, the immediate ordinary time period means an ordinary time period immediately after the latest priority time period.

When negative determination is made in S11 (NO in S11), the ECU 200 proceeds with the process to S13, and determines whether external charging operation is completed in the priority time period and the immediate ordinary time period immediately after the priority time period. If there are the plurality of priority time periods, the ECU 200 determines whether external charging operation is completed in the plurality of priority time periods and the immediate ordinary time period immediately after the latest priority time period. In the following description, the immediate ordinary time period immediately after the priority time period (if there are the plurality of priority time periods, the immediate ordinary time period immediately after the latest priority time period) is simply referred to as "immediate ordinary time period". The ECU 200 determines that external charging operation is completed in these time periods when the required charging time T is shorter than the total time of these time periods.

When affirmative determination is made in S13 (YES in S13), the ECU 200 allocates the charging time to the entire priority time period and an early part of the immediate ordinary time period in S14. Specifically, a part of the required charging time T is allocated to the entire priority time period, the remaining part of the required charging time T is preferentially allocated to a part of the immediate ordinary time period, the part being close to the start time of the immediate ordinary time period. Hereinafter, such an allocation pattern is also termed "second pattern".

When negative determination is made in S13 (NO in S13), the ECU 200 proceeds with the process to S15, and determines whether external charging operation is completed in the priority time period, the immediate ordinary time period and the preceding ordinary time period immediately before the priority time period. If there are the plurality of priority time periods, the ECU 200 determines whether external charging operation is completed in the plurality of priority time periods, the immediate ordinary time period and the preceding ordinary time period immediately before the latest priority time period. In the following description, the preceding ordinary time period immediately before the priority time period (if there are the plurality of priority time periods, the preceding ordinary time period immediately before the latest priority time period) is simply referred to as "preceding ordinary time period". The ECU 200 determines that external charging operation is completed in these time periods when the required charging time T is shorter than the total time of these time periods.

When affirmative determination is made in S15 (YES in S15), the ECU 200 allocates the charging time to the entire priority time period, the entire immediate ordinary time period and a later part of the preceding ordinary time period in S16. Specifically, the ECU 200 allocates a part of the required charging time T to the entire priority time period and the entire immediate ordinary time period, and preferentially allocates the remaining part of the required charging time T to a part of the preceding ordinary time period, the part being close to the end time of the preceding ordinary time period. Hereinafter, such an allocation pattern is also termed "third pattern".

When negative determination is made in S15 (NO in S15), the ECU 200 proceeds with the process to S17, and determines whether external charging operation is completed in the priority time period, the immediate ordinary time period, the preceding ordinary time period, and an ordinary time period other than the immediate and preceding ordinary time periods (hereinafter, referred to as "the other ordinary time period"). The ECU 200 determines that external charging operation is completed in these time periods when the required charging time T is shorter than the total time of these time periods.

When affirmative determination is made in S17 (YES in S17), the ECU 200 allocates the charging time to the entire priority time period, the entire immediate ordinary time period, the entire preceding ordinary time period and a part of the other ordinary time period in S18. Specifically, the ECU 200 allocates a part of the required charging time T to the entire priority time period, the entire immediate ordinary time period and the entire preceding ordinary time period, and allocates the remaining part of the required charging time T to a part of the other ordinary time period. Hereinafter, such an allocation pattern is also termed "fourth pattern".

In the fourth pattern, if there are the plurality of priority time periods, the other ordinary time period may be adjacent to the priority time period other than the latest priority time period. The ECU 200 determines which part of the other ordinary time period the remaining part of the required charging time T is allocated to on the basis of whether the other ordinary time period is adjacent to the priority time period other than the latest priority time period. For example, when the other ordinary time period is adjacent to any one of the priority time periods, the ECU 200 preferentially allocates the remaining part of the required charging time T to the adjacent part. Furthermore, if a plurality of the other ordinary time periods are adjacent to the priority time periods, the ECU 200 preferentially allocates the remaining part of the required charging time T to a later adjacent part. On the other hand, when the other ordinary time period is not adjacent to any of the priority time periods, the ECU 200 preferentially allocates the remaining part of the required charging time T to a later part of the other ordinary time period.

When negative determination is made in S17 (NO in S17), the ECU 200 allocates a part of the required charging time T to all the time periods other than the prohibited time period in S19. Hereinafter, such an allocation pattern is also termed "fifth pattern".

In the fifth pattern, there is no time period to which the remaining part of the required charging time T is allocated, so external charging operation is not completed even at the estimated completion time t(e). Therefore, when the fifth pattern is selected, the ECU 200 informs the user with the use of the display device 12, or the like, that external charging operation is not completed even at the estimated completion time t(e).

The ECU 200 carries out external charging operation in the time period allocated in accordance with any one of the above-described first to fifth patterns in S20.

Figure 3:
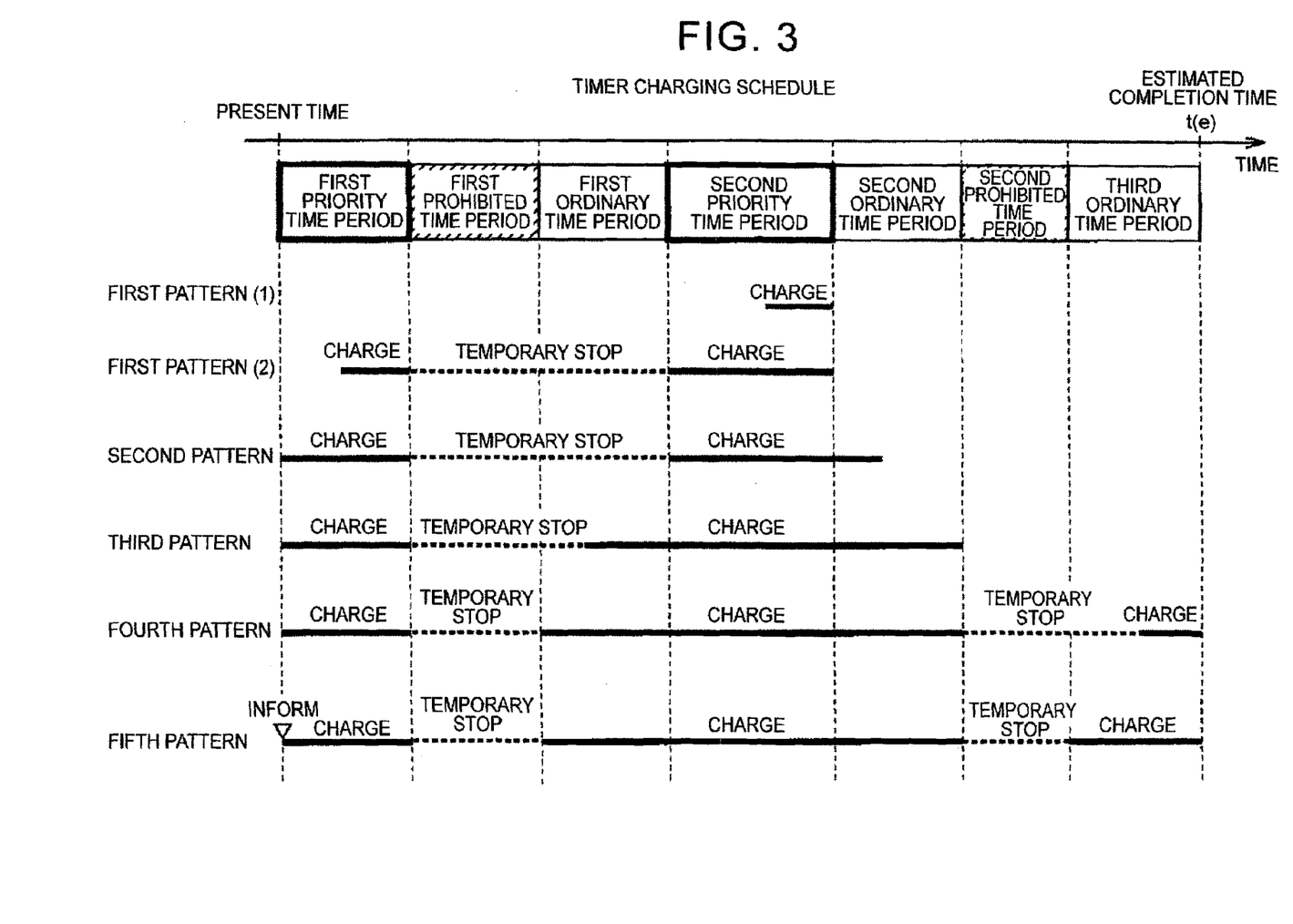
FIG. 3 is a view that illustrates a timer charging schedule.

FIG. 3 is a view that illustrates a timer charging schedule set by the ECU 200. In the example shown in FIG. 3, in a period from the present time to the estimated completion time t(e), two priority time periods, two prohibited time periods and three ordinary time periods are set. More specifically, the set time periods are, from the side close to the present time, the first priority time period, the first prohibited time period, the first ordinary time period, the second priority time period, the second ordinary time period, the second prohibited time period and the third ordinary time period.

When the required charging time T is shorter than the total time of the first and second priority time periods, the required charging time T is preferentially allocated to a later part of the first and second priority time periods.

When the required charging time T is shorter than the period of time of the second priority time period, the required charging time T is preferentially allocated to a part of the second priority time period, the part being close to the end time of the second priority time period, as shown by the first pattern (1).

When the required charging time T is longer than the period of time of the second priority time period, a part of the required charging time T is allocated to the entire second priority time period and the remaining part of the required charging time T is preferentially allocated to a part of the first priority time period, the part being close to the end time of the first priority time period, as shown by the first pattern (2).

Thus, it is possible to complete external charging operation by the estimated completion time t(e) while utilizing the priority time periods. Furthermore, not only the priority time period is simply utilized but also a later part of the priority time period is preferentially utilized, so it is possible to retard the timing at which the battery enters the high SOC state (reduce the standing time in the high SOC state as much as possible).

When it is not possible to ensure the required charging time T only through allocation of the first pattern, the remaining part of the required charging time T (a period of time obtained by subtracting the total time of the first and second priority time periods from the required charging time T) is allocated to the second ordinary time period immediately after the second priority time period. At this time, the remaining part of the required charging time T is preferentially allocated to an early part of the second ordinary time period.

In this way, by utilizing the second ordinary time period immediately after the second priority time period, it is possible to retard the timing at which the battery enters the high SOC state as compared to that by utilizing a time period earlier than the second priority time period.

Furthermore, it is possible to continuously carry out external charging operation by preferentially utilizing an early part of the second ordinary time period (a part adjacent to the second priority time period). Therefore, it is possible to suppress the number of temporary stops of external charging operation. That is, if a later part of the second ordinary time period is utilized, external charging operation is temporarily stopped at the time of shifting from the second priority time period to the second ordinary time period, so the number of operations of the system relay 71 and the charging relay 72 increases. In the present embodiment, such an inconvenience can be solved.

When it is not possible to ensure the required charging time T only through allocation of the second pattern, the remaining part of the required charging time T (a period of time obtained by subtracting the total time of the first and second priority time periods and the second ordinary time period from the required charging time T) is allocated to the first ordinary time period immediately before the second priority time period.

At this time, the remaining part of the required charging time T is preferentially allocated to a later part of the first ordinary time period. Thus, it is possible to continuously carry out external charging operation at the time of shifting from the first ordinary time period to the second priority time period while retarding the timing at which the battery enters the high SOC state as much as possible.

When it is not possible to ensure the required charging time T only through allocation of the third pattern, the remaining part of the required charging time T (a period of time obtained by subtracting the total time of the first and second priority time periods and the first and second ordinary time periods from the required charging time T) is allocated to the other third ordinary time period. Because the third ordinary time period is not adjacent to the first priority time period, the remaining part of the required charging time T is preferentially allocated to a later part of the third ordinary time period (a part close to the estimated completion time t(e)). Thus, it is possible to retard the timing at which the battery enters the high SOC state as much as possible.

When it is not possible to ensure the required charging time T even through allocation of the fourth pattern, a part of the required charging time T is allocated to all the time periods other than the prohibited time periods (the first and second priority time periods and the first to third ordinary time periods).

When the timer charging schedule is set in the fifth pattern, the user is informed of the fact that external charging operation is not completed even at the estimated completion time t(e). By checking the message, the user is allowed to take measures, such as issuing a request to reset the timer charging schedule by cancelling part or all of the prohibited time periods.

As described above, the ECU 200 according to the present embodiment schedules timer charging operation so that external charging operation is preferentially carried out in order of the priority time period, the immediate ordinary time period immediately after the priority time period, and the preceding ordinary time period immediately before the priority time period. Therefore, it is possible to schedule optimal timer charging operation in consideration of cost reduction of external charging operation, suppressing the number of temporary stops of external charging operation and avoiding a standing situation in the high SOC state.

The present embodiment may be, for example, changed as described below. In the above-described first and fourth patterns, a later time period is preferentially utilized in order to avoid a standing situation in the high SOC state; however, a time period in which external charging operation is completed only once may be preferentially utilized in order to give higher priority to suppressing the number of temporary stops of external charging operation.

When the priority time period is extremely short, when the prohibited time period is extremely long or when the number of set time periods is too large, there is a concern that the number of temporary stops of external charging operation increases. In order to avoid such an inconvenience, a unit for limiting the number of set time periods per unit time (for example, one day) may be provided or a unit for limiting a shortest period of time of each priority time period and a longest period of time of each prohibited time period may be provided.

When it is apparently disadvantageous to prevention of degradation of the battery or prevention of degradation of the relays, such as when a standing time in the high SOC state is extremely long and when the number of temporary stops of external charging operation is extremely large, the user may be informed of that fact.

The embodiment described above is illustrative and not restrictive in all respects.

The invention claimed is:

1. A vehicle configured to carry out external charging operation in which an in-vehicle battery is charged with electric power from a device outside the vehicle, the vehicle comprising:
   the in-vehicle battery;
   a charger configured to output electric power from the device outside the vehicle to the in-vehicle battery; and
   a control device configured to control the charger so that the external charging operation is completed by a time set by a user, and configured to preferentially allocate a period of time during which an external charging operation is carried out in order of at least one priority time period set by the user, an immediate time period immediately after the at least one priority time period and a preceding time period immediately before the at least one priority time period, the priority time period set by the user being a time period in which the external charging operation is preferred to be carried out, wherein
   when the control device determines that an amount of time required to complete the external charging operation is shorter than a total time of the at least one priority time period, the control device is configured to preferentially allocate the time during which the external charging operation is carried out to a latest part within the at least one priority time period, and
   when the control device determines that an amount of time required to complete the external charging operation is longer than a total time of the at least one priority time period but shorter than a total time of the at least one priority time period plus the immediate time period, the control device is configured to preferentially allocate the time during which the external charging operation is carried out to an entirety of the at least one priority time period and an earliest part of the immediate time period.

2. The vehicle according to claim 1, wherein
   the control device is configured to, when the at least one priority time period is a plurality of priority time periods and when the required period of time is longer than the total time of the plurality of priority time periods and the time period immediately after a latest priority time period of the plurality of priority time periods and is shorter than a total time of the plurality of priority time periods, the time period immediately after the latest priority time period and the time period immediately before the latest priority time period, allocate the period of time during which the external charging operation is carried out to the entirety of the plurality of priority time periods, an entirety of the time period immediately after the latest priority time period and a part of the time period immediately before the latest priority time period, the part being adjacent to the latest priority time period.

3. The vehicle according to claim 2, wherein
   the control device is configured to, when the required period of time is longer than the total time of the plurality of priority time periods, immediate time periods respectively immediately after the corresponding priority time periods and preceding time periods respectively immediately before the corresponding priority time periods and is shorter than a total time of the plurality of priority time periods, the immediate time periods, the preceding time periods and another time period, allocate the period of time during which the external charging operation is carried out to the entirety of the plurality of priority time periods, an entirety of the immediate time periods, an entirety of the preceding time periods and a part of the another time period, and
   the control device is configured to set the another time period as a time period that excludes the entirety of the priority time periods, the entirety of the immediate time periods, the entirety of the preceding time periods and the charging prohibited time period from a time period between present time and estimated charging completion time.

4. The vehicle according to claim 3, wherein
   the control device is configured to, when the required period of time is longer than the total time of the plurality of priority time periods, the immediate time periods, the preceding time periods and the another time period, allocate the period of time during which the external charging operation is carried out to the entirety of the plurality of priority time periods, the entirety of the immediate time periods, the entirety of the preceding time periods and an entirety of the another time period.

5. The vehicle according to claim 2, wherein
   the control device is configured to, when the control device allocates the period of time during which the external charging operation is carried out to the part of another time period and when the another time period is adjacent to the priority time period other than the latest priority time period, preferentially allocate the period of time during which the external charging operation is carried out to an adjacent part to the priority time period other than the latest priority time period and,
   the control device is configured to, when the control device allocate the period of time during which the external charging operation is carried out to the part of the another time period and when the another time period is not adjacent to the priority time period other than the latest priority time period, preferentially allocates the period of time during which the external charging operation is carried out to a later part of the another time period.

6. The vehicle according to claim 1, wherein
the control device is configured not to allocate the period of time during which the external charging operation is carried out to a charging prohibited time period, when the charging prohibited time period is set by the user.

7. A vehicle configured to carry out external charging operation in which an in-vehicle battery is charged with electric power from a device outside the vehicle, the vehicle comprising:
the in-vehicle battery;
a charger configured to output electric power from the device outside the vehicle to the in-vehicle battery; and
a control device configured to
control the charger so that the external charging operation is completed by a time set by a user, and configured to preferentially allocate a period of time during which an external charging operation is carried out in order of at least one priority time period set by the user, an immediate time period immediately after the at least one priority time period and a preceding time period immediately before the at least one priority time period, the priority time period set by the user being a time period in which the external charging operation is preferred to be carried out, wherein
when the control device determines that an amount of time required to complete the external charging operation is shorter than a total time of the at least one priority time period, the control device is configured to preferentially allocate the time during which the external charging operation is carried out to a latest part within the at least one priority time period, and
when the control device determines that an amount of time required to complete the external charging operation is longer than a total time of the at least one priority time period but shorter than a total time of the at least one priority time period plus the immediate time period, the control device is configured to preferentially allocate the time during which the external charging operation is carried out to an entirety of the at least one priority time period and an earliest part of the immediate time period
when the required period of time is longer than a total time of the priority time period, the immediate time period and the preceding time period and is shorter than the total time of the priority time period, the immediate time period, the preceding time period and another time period, allocate the period of time during which the external charging operation is carried out to an entirety of the priority time period, an entirety of the immediate time period, an entirety of the preceding time period and a later part of the another time period, and
set the another time period as a time period that excludes the entirety of the priority time periods, the entirety of the immediate time periods, the entirety of the preceding time periods and a charging prohibited time period set by the user from a time period between present time and estimated charging completion time.

8. The vehicle according to claim 7, wherein
the control device is configured to, when the required period of time is longer than the total time of the priority time period, the immediate time period, the preceding time period and the another time period, allocate the period of time during which the external charging operation is carried out to the entirety of the priority time period, the entirety of the immediate time period, the entirety of the preceding time period and an entirety of the another time period.

9. The vehicle according to claim 7, wherein
the control device is configured not to allocate the period of time during which the external charging operation is carried out to a charging prohibited time period when the charging prohibited time period is set by the user.

* * * * *